United States Patent
Kang et al.

(10) Patent No.: US 9,059,598 B2
(45) Date of Patent: Jun. 16, 2015

(54) WIRELESS CHARGING METHOD AND APPARATUS

(75) Inventors: Noh-Gyoung Kang, Seoul (KR); Eun-Tae Won, Seoul (KR); Joon-Ho Park, Gyeonggi-do (KR); Jun-Ho Koh, Gyeonggi-do (KR); Se-Ho Park, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 761 days.

(21) Appl. No.: 13/278,576

(22) Filed: Oct. 21, 2011

(65) Prior Publication Data

US 2012/0098485 A1    Apr. 26, 2012

(30) Foreign Application Priority Data

Oct. 21, 2010   (KR) .......................... 10-2010-0103170

(51) Int. Cl.
*H01M 10/44* (2006.01)
*H01M 10/46* (2006.01)
*H02J 7/02* (2006.01)

(52) U.S. Cl.
CPC ...................................... *H02J 7/025* (2013.01)

(58) Field of Classification Search
CPC ............. H02J 7/025; H02J 7/007; H02J 7/34
USPC .......................... 320/108, 107, 138; 307/104
See application file for complete search history.

(56) References Cited

U.S. PATENT DOCUMENTS

| | | | |
|---|---|---|---|
| 4,088,499 A | 5/1978 | Brust et al. | |
| 5,734,254 A * | 3/1998 | Stephens | ....................... 320/106 |
| 5,982,139 A | 11/1999 | Parise | |
| 7,893,564 B2 * | 2/2011 | Bennett | ......................... 307/104 |
| 8,217,535 B2 * | 7/2012 | Uchida et al. | ................. 307/104 |
| 8,466,583 B2 * | 6/2013 | Karalis et al. | ................. 307/104 |
| 2008/0171512 A1 | 7/2008 | Jack et al. | |
| 2009/0243394 A1 | 10/2009 | Levine | |
| 2009/0315412 A1 | 12/2009 | Yamamoto et al. | |
| 2010/0033021 A1 * | 2/2010 | Bennett | ......................... 307/104 |
| 2012/0173174 A1 | 7/2012 | Gaarder | |
| 2012/0214536 A1 | 8/2012 | Kim et al. | |

FOREIGN PATENT DOCUMENTS

| | | |
|---|---|---|
| CN | 101809452 | 8/2010 |
| EP | 1 744 443 | 1/2007 |
| JP | 2004-203178 | 7/2004 |
| WO | WO 2007/089680 | 8/2007 |
| WO | WO 2009/077195 | 6/2009 |
| WO | WO 2011/025212 | 3/2011 |

OTHER PUBLICATIONS

European Search Report dated Mar. 17, 2015 issued in counterpart application No. 11834670.9-1804.
Chinese Office Action dated Oct. 29, 2014 issued in counterpart application No. 201180048427.3.

* cited by examiner

*Primary Examiner* — Edward Tso
(74) *Attorney, Agent, or Firm* — The Farrell Law Firm, P.C.

(57) ABSTRACT

A wireless charging method includes synchronizing power phases of at least two charging power supply devices, and wirelessly charging a terminal using the at least two charging power supply devices.

19 Claims, 7 Drawing Sheets

WIRELESS CHARGING METHOD AND APPARATUS

PRIORITY

This application claims priority under 35 U.S.C. §119(a) to a Korean Patent Application filed in the Korean Intellectual Property Office on Oct. 21, 2010 and assigned Serial No. 10-2010-0103170, the contents of which are incorporated herein by reference.

BACKGROUND OF THE INVENTION

1. Field of the Invention

The present invention relates generally to a charging method and apparatus, and more particularly, to a method and apparatus for performing wireless charging.

2. Description of the Related Art

A mobile terminal, such as a cell phone or a Personal Digital Assistant (PDA), is generally powered by a rechargeable battery that is recharged by electrical energy from a separate charging device. The charging device and the battery have their own separate external contact terminals, and are electrically connected by mechanically connecting the contact terminals to each other.

This contact-type charging scheme may often undergo contamination by foreign substances, such as moisture, causing incorrect battery charging, because the contact terminals protrude outward.

To address these and other problems, various wireless charging or non-contact charging technologies have recently been developed and used for many electronic devices.

The wireless charging technology, which uses wireless power transmission/reception, allows a user to automatically charge a rechargeable battery by simply placing it on a charging pad without connecting a separate charging connector to a mobile terminal with the rechargeable battery. Generally, devices that use the wireless charging technology include wireless electric toothbrushes and wireless electric shavers. This wireless charging technology may increase its waterproof features as it wirelessly charges electronic products, and may also increase mobility of electronic devices because it does not required wired chargers. Wireless charging technology is expected to evolve significantly in the growing era of electric vehicles.

This wireless charging technique includes an electromagnetic induction scheme using coils, a resonant scheme using resonance, and a Radio Frequency (RF)/microwave radiation scheme that converts electrical energy into a microwave and transfers the energy.

Up to now, the electromagnetic induction scheme has been primarily used. However, as many experiments of wirelessly transmitting power at a distance of several tens of meters using microwaves have recently been successful, it is highly expected that all electronic products may be wirelessly charged without cables in the near future.

The electromagnetic induction-based power transmission method is a scheme of transferring power between a primary coil and a secondary coil. Based on the principle that an induced current occurs when a magnet moves around coils, a time-varying magnetic field is generated in a transmitter and a current is induced at a receiver according to the change in the magnetic field, generating electrical energy. This phenomenon is called magnetic induction, and a magnetic induction-based power transmission method has excellent energy transmission efficiency.

The electromagnetic induction scheme has been applied to various devices. The non-contact charging technology, known as the conventional wireless charging technology, mostly includes electromagnetic induction methods, and this technology was originally applied to products such as electric shavers and electric toothbrushes that use nickel batteries.

As for the resonant scheme, Professor Soljacic at Massachusetts Institute of Technology (MIT) disclosed in 2005 a system that can be wirelessly supplied electricity, even though it is spaced several meters apart from a charging device, using the resonant scheme-based power transmission principle known as Coupled Mode Theory. The wireless charging system disclosed by the MIT team uses the physical concept that, based on the resonance theory, if a tuning fork resonates, an adjacent wine glass also resonates at the same oscillation frequency. The research team caused an electromagnetic wave containing electrical energy to resonate, instead of causing the tuning fork to resonate. It is known that unlike the electromagnetic wave, the resonant electrical energy does not affect surrounding machines and humans, because the resonant electrical energy is directly transferred only to the devices having the resonant frequency, and its unused portion is reabsorbed as an electromagnetic wave instead of spreading in the air.

The RF/microwave radiation scheme is a new-concept power transmission scheme that converts power energy into a microwave advantageous for its wireless transmission, and transfers it for energy supply. This scheme transfers electrical energy instead of transmitting signals used in wireless communication devices such as a radio receiver and a wireless phone. While the common communication system transmits signals on a carrier, the wireless power transmission system transmits only the carrier.

There is a need for the application of the foregoing wireless charging technology to the art of wireless communication devices, and to develop a method for causing power supply/demand devices to provide charging power to other devices when necessary.

SUMMARY OF THE INVENTION

An aspect of the present invention is to address at least the above-mentioned problems and/or disadvantages and to provide at least the advantages described below. Accordingly, an aspect of embodiments of the present invention provides a method and apparatus in which a plurality of charging power supply devices may simultaneously transmit charging power to at least one terminal.

In accordance with the present invention, there is provided a wireless charging method including synchronizing power phases of at least two charging power supply devices, and wirelessly charging a terminal using the at least two charging power supply devices.

In accordance with the present invention, there is provided a charging power supply device including a wireless charging handler for controlling supply of charging power, a power phase synchronizer for synchronizing a power phase with that of another charging power supply device, and a power converter for converting power supplied from a power supply into wireless power to be supplied to a terminal.

In accordance with the present invention, there is provided a wireless charging method including sending a wireless charging request to a charging power supply device, receiving a response to the wireless charging request from the charging power supply device, setting a power phase synchronization mode of the charging power supply device, synchronizing a power phase of the charging power supply device based on the power phase synchronization mode, and allowing the charging power supply device to perform wireless charging.

In accordance with the present invention, there is provided a mobile terminal including a wireless charging handler for setting a power phase synchronization mode of at least one charging power supply device, providing information thereabout to the charging power supply device, and controlling wireless charging, and a wireless power receiver for receiving wireless power supplied from the charging power supply device, and supplying the received wireless power to a battery.

BRIEF DESCRIPTION OF THE DRAWINGS

The above and other aspects, features, and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

When a plurality of charging power supply devices simultaneously transmit their charging power to at least one terminal, the power transmitted by the plurality of charging power supply devices may have different phase characteristics, drastically reducing the power transmission efficiency. Specifically, assume that first and second charging power supply devices simultaneously transmit their wireless power to a single mobile terminal, and an absolute power supplied by the first charging power supply device is defined as A, its phase is defined as x, an absolute power supplied by the second charging power supply device is defined as B, and its phase is defined as x+θ. A sum of the two powers may be developed as in Equation (1) below.

$$A\sin x + B\sin(x + \theta) = A\sin x + B(\sin x \cos\theta + \cos x \sin\theta) \quad (1)$$
$$= A\sin x + B\cos\theta \sin x + B\sin\theta \cos x$$
$$= (A + B\cos\theta)\sin x + B\sin\theta \cos x$$

If cos θ is treated as a constant, Equation (1) may be rewritten as Equation (2) below.

$$\begin{aligned}
&= \sqrt{A^2 + B^2\cos^2\theta + 2AB\cos\theta + B_2\sin^2\theta}\, \cos(x - \omega), \quad (2) \\
&\left(\text{Herein, } \tan\omega = \frac{A + B\cos\theta}{B\sin\theta}\right) \\
&= \sqrt{A^2 + B^2 + 2AB\cos\theta}\, \cos(x - \omega),\ (\because \sin^2\theta + \cos^2\theta = 1) \\
&\leq \sqrt{A^2 + B^2 + 2AB}\, \cos(x - \omega),\ (\because \cos\theta \leq 1) \\
&= (A + B)\cos(x - \omega)
\end{aligned}$$

In Equation (2), it can be understood that a maximum value of a sum of the powers supplied by the first and second charging power supply devices is A+B.

Figure 1A:
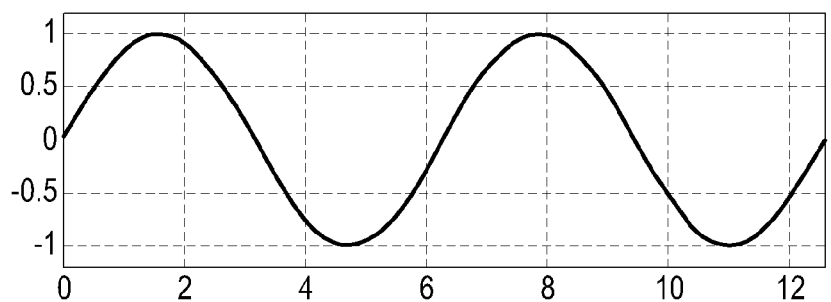
FIG. 1A illustrates power supplied by a charging power supply device.
Figure 1B:
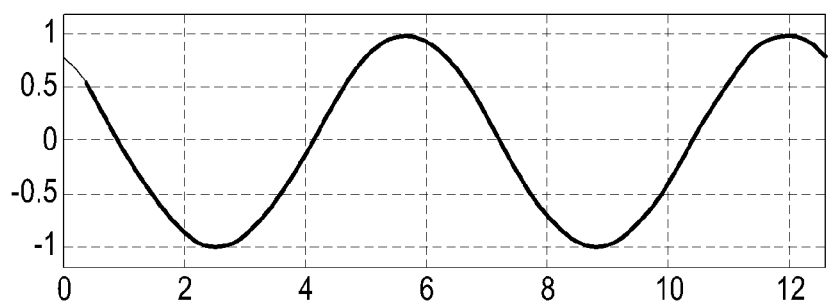
FIG. 1B illustrates power supplied by another charging power supply device.
Figure 2:
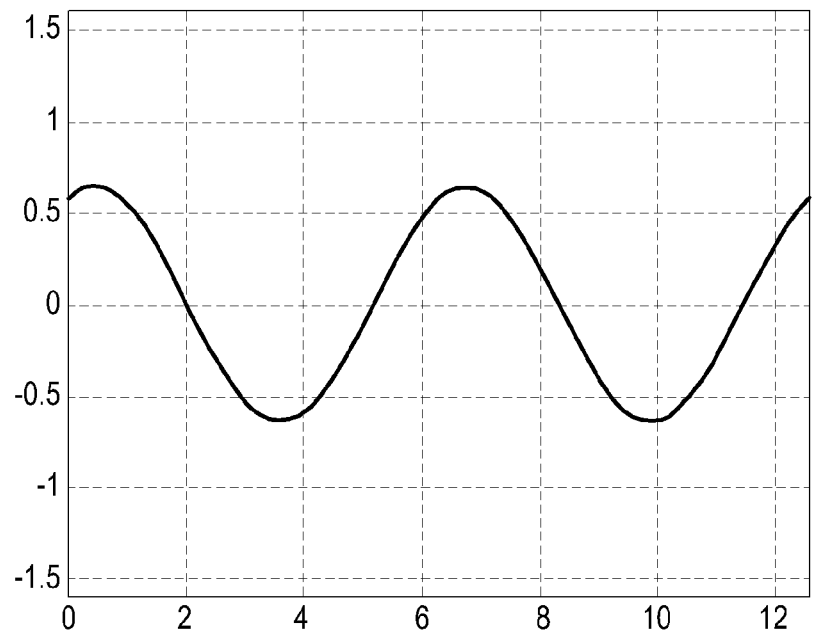
FIG. 2 illustrates a sum of powers shown in FIGS. 1A and 1B.

Referring to FIG. 1A showing a power supplied by the first charging power supply device, FIG. 1B showing a power supplied by the second charging power supply device, and FIG. 2 showing a sum of the powers supplied by the first and second charging power supply devices, although maximum values of the powers supplied by the first and second charging power supply devices are both 1, a receiving mobile terminal receives power having values that are relatively smaller than the maximum values of the power supplied by the first and second charging power supply devices, if the powers supplied by the first and second charging power supply devices have different phases.

Therefore, there is a need for a scheme for minimizing a loss of power transmission, which may be caused by a difference between power phases, when a plurality of charging power supply devices simultaneously transmit their charging powers to at least one terminal. To this end, a charging power supply method and apparatus according to the present invention provides a method for synchronizing phases of powers transmitted by a plurality of charging power supply devices.

Figure 3:
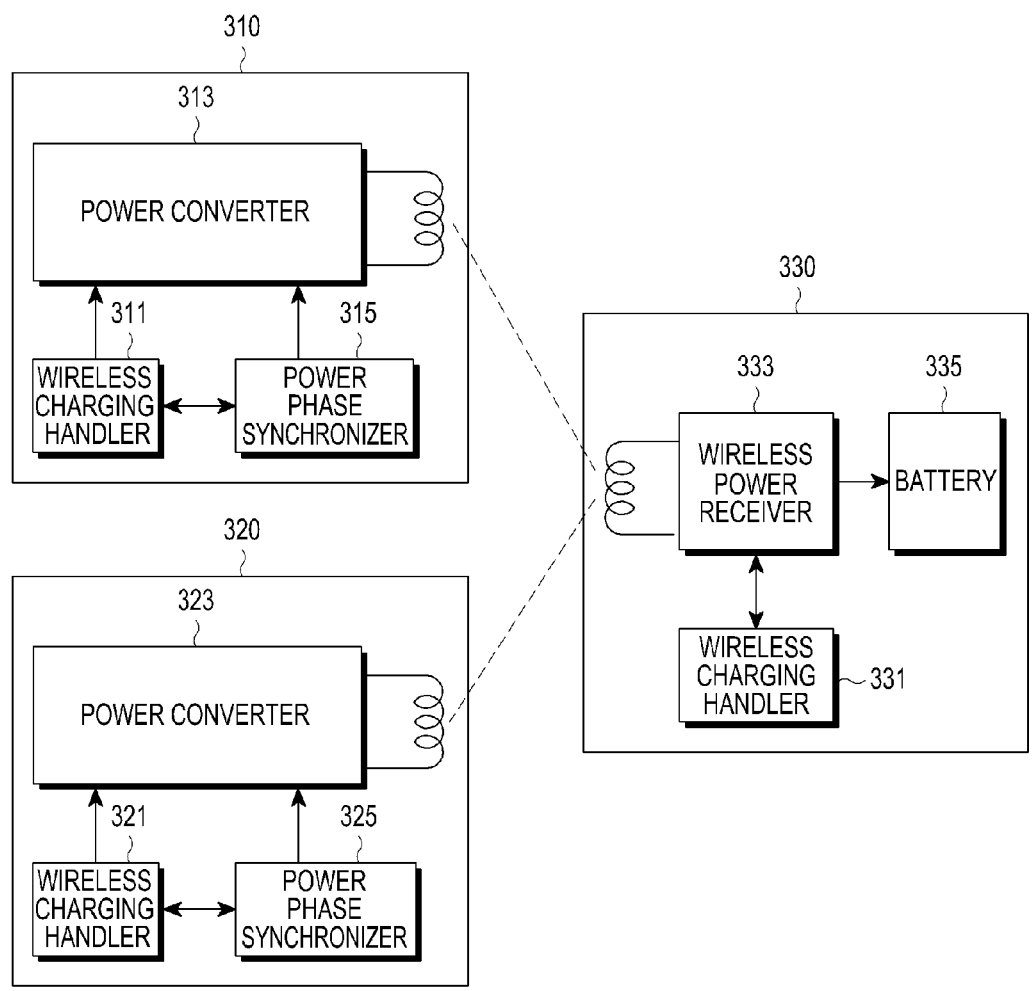
FIG. 3 illustrates a configuration of a wireless charging system including charging power supply devices according to an embodiment of the present invention.

FIG. 3 illustrates a wireless charging system including charging power supply devices according to an embodiment of the present invention.

The wireless charging system illustrated in FIG. 3 includes first and second charging power supply devices 310 and 320 for transmitting wireless power, and a mobile terminal 330 for receiving wireless power.

The first and second charging power supply devices 310 and 320 include the same components, and may perform different operations according to whether a reference signal for power phases is provided. Therefore, for simplicity, only the structure of the first charging power supply device 310 will be described. However, a description will be made of the manner in which the first and second charging power supply devices 310 and 320 operate depending on whether a reference signal for power phases is provided.

The first charging power supply device 310 includes a wireless charging handler 311 for controlling transmission of wireless power, a power converter 313 having operation controlled by the wireless charging handler 311, and which converts input power into wireless power and transmits the wireless power, and a power phase synchronizer 315 for synchronizing its power phase with that of another charging power supply device (e.g., the second charging power supply device 320).

The wireless charging handler 311 receives a message for requesting a start and/or an end of wireless power transmission from the mobile terminal 330 through communication with the mobile terminal 330, and controls operations of the power converter 313 and the power phase synchronizer 315. Specifically, the wireless charging handler 311 requests the power converter 313 and the power phase synchronizer 315 to start their operations upon receiving a message for requesting a start of wireless power transmission from the mobile terminal 330, and requests an end of an operation of the power converter 313 upon receiving a message for requesting an end of wireless power transmission.

The power phase synchronizer 315 synchronizes a power phase with that of another charging power supply device (e.g., the second charging power supply device 320). In other words, the power phase synchronizer 315 first determines whether its mode for wireless power supply is set as a master mode. If its mode is set as a master mode, the power phase synchronizer 315 requests the power converter 313 to transmit wireless power. Otherwise, if its mode is not set as a master mode, the power phase synchronizer 315 determines whether another charging power supply device exists within a predetermined range. If another charging power supply device exists within a predetermined range. In the absence of another charging power supply device within a predetermined range, the power phase synchronizer 315 re-sets the mode for wireless power supply as a master mode, while in the presence of another charging power supply device within a predetermined range, the power phase synchronizer 315 sets the mode for wireless power supply as a slave mode.

If the mode for wireless power supply is set as a slave mode, the power phase synchronizer 315 performs synchronization with another charging power supply device. Specifically, the power phase synchronizer 315 detects a phase of the wireless power from a wireless power signal that another charging power supply device transmits to the mobile terminal 330, and controls a phase of the power output from the power converter 313, for synchronization with the detected power phase.

In order to synchronize a phase of wireless power, the power phase synchronizer 315 being set in a slave mode detects a phase of the wireless power from a wireless power signal transmitted to the mobile terminal 330. However, the present invention is not limited thereto. For example, to synchronize a power phase, the power phase synchronizer 315 being set in a master mode may transmit a synchronization signal, and the power phase synchronizer 315 being set in a slave mode may receive the synchronization signal and detect a phase of the wireless power from the synchronization signal.

Although the wireless charging handler 311 receives a message for requesting a start of and/or an end of wireless power transmission from the mobile terminal 330, the wireless charging handler 311 may also receive a message for requesting a start of and/or an end of wireless power transmission from a user, and handle the received message(s).

The mobile terminal 330 includes a wireless charging handler 331 for handling a start and an end of wireless charging, and a wireless power receiver 333 for receiving wireless power supplied from a charging power supply device(s) and supplying the received wireless power to a battery 335 under control of the wireless charging handler 331.

Specifically, the wireless charging handler 331 provides an interface for setting a start and an end of wireless charging on a display, and receives a start and an end of wireless charging from a user. Upon receiving an input indicating a start of wireless charging from the user, the wireless charging handler 331 sends a message for requesting wireless power transmission to a charging power supply device, and inputs a control signal instructing a start of an operation to the wireless power receiver 333. Similarly, upon receiving an input indicating an end of wireless charging from the user or from the battery 335, the wireless charging handler 331 sends a message for completion of wireless power transmission to a charging power supply device, and inputs a control signal instructing an end of an operation to the wireless power receiver 333.

The wireless charging handler 331 receives, from the user, conditions for a start and an end of wireless charging, e.g., conditions for a battery level required to start and end wireless charging, conditions for a time to start and end wireless charging, and conditions for a position to start and end wireless charging, and determines if the mobile terminal 330 meets the conditions. For example, the wireless charging handler 331 checks a level of the battery 335 at regular intervals in order to determine whether the mobile terminal 330 meets the conditions for a battery level required to start wireless charging.

If a level of the battery 335 is relatively lower than a battery level required to start wireless charging, the wireless charging handler 331 sends a message for requesting wireless power transmission to a charging power supply device, and inputs a control signal instructing a start of the wireless power transmission operation to the wireless power receiver 333. If a level of the battery 335, which is checked at regular intervals, is relatively higher than a predetermined battery level as charging of the battery 335 is completed, then the wireless charging handler 331 sends a message for completion of wireless power transmission to a charging power supply device, and inputs a control signal instructing an end of the wireless power transmission operation to the wireless power receiver 333. The wireless charging handler 331 may check the conditions for a time to start and end wireless charging or the conditions for a position to start and end wireless charging, to request a charging power supply device to start and end wireless power transmission, and may transmit a control signal for controlling a start and an end of the operation of the wireless power receiver 333.

In the present invention, it may be assumed that the first and second charging power supply devices 310 and 320 may set their modes for wireless power supply. However, the present invention is not limited thereto, and the mobile terminal 330 may set modes for wireless power supply, and provide information about the set modes to the first and second charging power supply devices 310 and 320. In this case, the wireless charging handler 331 of the mobile terminal 330 sends a message for requesting wireless power transmission, and then, receives response messages from the first and second charging power supply devices 310 and 320. Based on the response messages, the wireless charging handler 331 sets modes for wireless power supply, and transmits information about the set modes to the first and second charging power supply devices 310 and 320.

The operation of the first and second charging power supply devices 310 and 320 and the mobile terminal 330 will now be described in detail.

If a user clicks an input indicating a start of wireless charging on an interface provided by the wireless charging handler 331 of the mobile terminal 330, or if it is determined that the wireless charging handler 331 meets charging start conditions preset by the user, the wireless charging handler 331 sends a message for requesting wireless power transmission to the first and second charging power supply devices 310 and 320 existing within a predetermined range, and inputs a control signal instructing a start of an operation to the wireless power receiver 333.

In response, the wireless charging handler 311 of the first charging power supply device 310 and the wireless charging handler 321 of the second charging power supply device 320 receive the message for requesting wireless power transmission, and perform wireless power transmission. The wireless charging handler 311 of the first charging power supply device 310 requests the power converter 313 and the power phase synchronizer 315 to start their operations. The power converter 313 waits for conversion of input power, for wireless power transmission. The power phase synchronizer 315 synchronizes its power phase with that of another charging power supply device (e.g., the second charging power supply device 320). In other words, the power phase synchronizer 315 inputs a control signal instructing wireless power transmission to the power converter 313, as its mode for wireless power supply is first set as a master mode. Upon receiving the control signal, the power converter 313, which was waiting for conversion of input power for wireless power transmission, may convert input power and transmit it to the mobile terminal 330.

The wireless charging handler 321 of the second charging power supply device 320 requests a power converter 323 and a power phase synchronizer 325 to start their operations. The power converter 323 waits for conversion of input power, for wireless power transmission. The power phase synchronizer 325 determines whether another charging power supply device exists within a predetermined range, as its mode for wireless power supply is not set as a master mode. The power phase synchronizer 325 sets the mode for wireless power supply as a slave mode, because another charging power supply device (i.e., the first charging power supply device 310) exists within a predetermined range. The power phase synchronizer 325 detects a phase of the wireless power from a wireless power signal that the first charging power supply device 310 transmits to the mobile terminal 330, and controls a power phase of the power converter 323 so that a phase of the power output from the power converter 323 may be synchronized with the detected power phase. Accordingly, the power converter 323 may transmit wireless power having the same phase as that of the power converter 313 of the first charging power supply device 310, to the mobile terminal 330.

The wireless power receiver 333 of the mobile terminal 330 receives wireless power simultaneously from the power converter 313 of the first charging power supply device 310 and the power converter 323 of the second charging power supply device 320, and supplies the received wireless power to the battery 335, during which a new charging power supply device (not shown) may request power supply.

Specifically, a wireless charging handler included in the new charging power supply device provides a user with an interface on which the user may choose a power supply, and receives a power supply request from the user. In response, the wireless charging handler in the new charging power supply device instructs a power converter and a power phase synchronizer to start their operations. The power phase synchronizer sets its mode for wireless power supply as a slave mode, detects a power phase of the first charging power supply device 310, and synchronizes its power phase with the detected power phase. The power converter transmits wireless power having the detected power phase to the mobile terminal 330.

Upon completion of its charging, the battery 335 provides a signal indicating the completion of charging of the battery 335 to the wireless charging handler 331 or the wireless power receiver 333. In response, the wireless charging handler 331 provides a control signal instructing an end of charging to the wireless power receiver 333, which then ends its operation. At the same time, the wireless charging handler 331 sends a message instructing an end of wireless power transmission to wireless charging handlers in charging power supply devices which are supplying wireless power, and the wireless charging handlers end operations of their power converters.

In the above-described operations of the first and second charging power supply devices 310 and 320, it is assumed that the power phase synchronizer 325 of the second charging power supply device 320 detects a phase of the wireless power from the wireless power signal that the first charging power supply device 310 transmits to the mobile terminal 330, in order to synchronize its power phase with that of the first charging power supply device 310. However, the present invention is not limited thereto. In the alternative, the power phase synchronizer 315 of the first charging power supply device 310 may transmit a synchronization signal for synchronizing a power phase, for example, a beacon signal including synchronization information for a power phase, to the power phase synchronizer 325 of the second charging power supply device 320, and the power phase synchronizer 325 of the second charging power supply device 320 may check the synchronization signal and synchronize its power phase based thereon.

Figure 4:
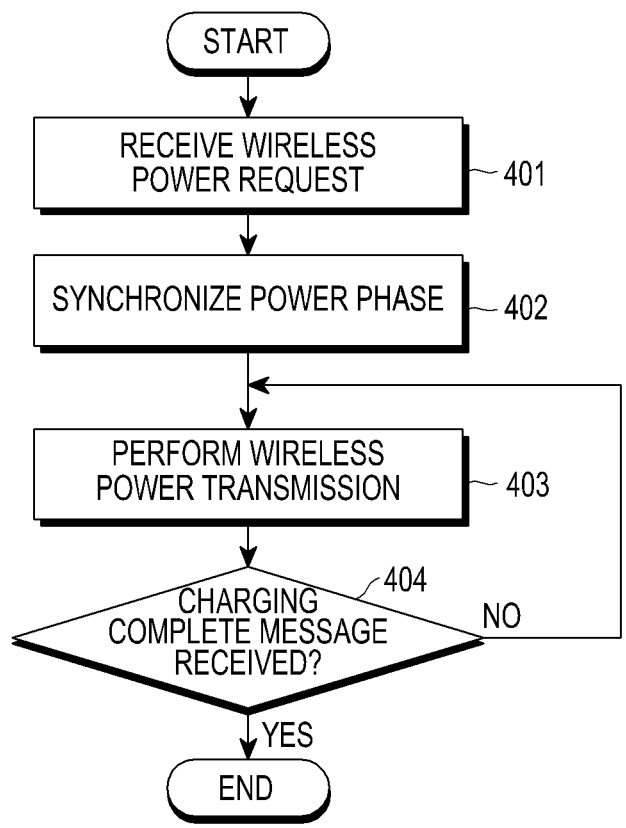
FIG. 4 illustrates a wireless charging method according to an embodiment of the present invention.

FIG. 4 illustrates a wireless charging method by a charging power supply device according to an embodiment of the present invention.

The wireless charging method of FIG. 4 includes receiving a message for requesting wireless power transmission from a mobile terminal in step 401, synchronizing a power phase in response to the request in step 402, and transmitting wireless power based on the synchronized power phase in step 403. The wireless charging method may further include determining whether to continue wireless power transmission in step 404. Specifically, it is determined in step 404 whether a charging complete message is received from the mobile terminal, and if the charging complete message is received, the wireless power supply is ended and wireless power is no longer transmitted.

In the wireless charging method, to request wireless charging, a mobile terminal broadcasts a message for requesting wireless power transmission to its surrounding charging power supply devices, and a charging power supply device receives a message indicating the wireless charging request in step 401 of receiving a wireless power request.

Multiple charging power supply devices may exist around a mobile terminal, and each of the multiple charging power supply devices may receive a message for requesting wireless power transmission, which is transmitted from the mobile terminal. Therefore, the multiple charging power supply devices may simultaneously transmit their wireless power to the mobile terminal. However, if the wireless powers simultaneously transmitted by the multiple charging power supply devices are different in phase, charging power reception efficiency may be reduced due to the difference between power phases. To solve this problem, a process of synchronizing phases of the wireless powers simultaneously transmitted from the multiple charging power supply devices is performed in step 402.

Figure 5:
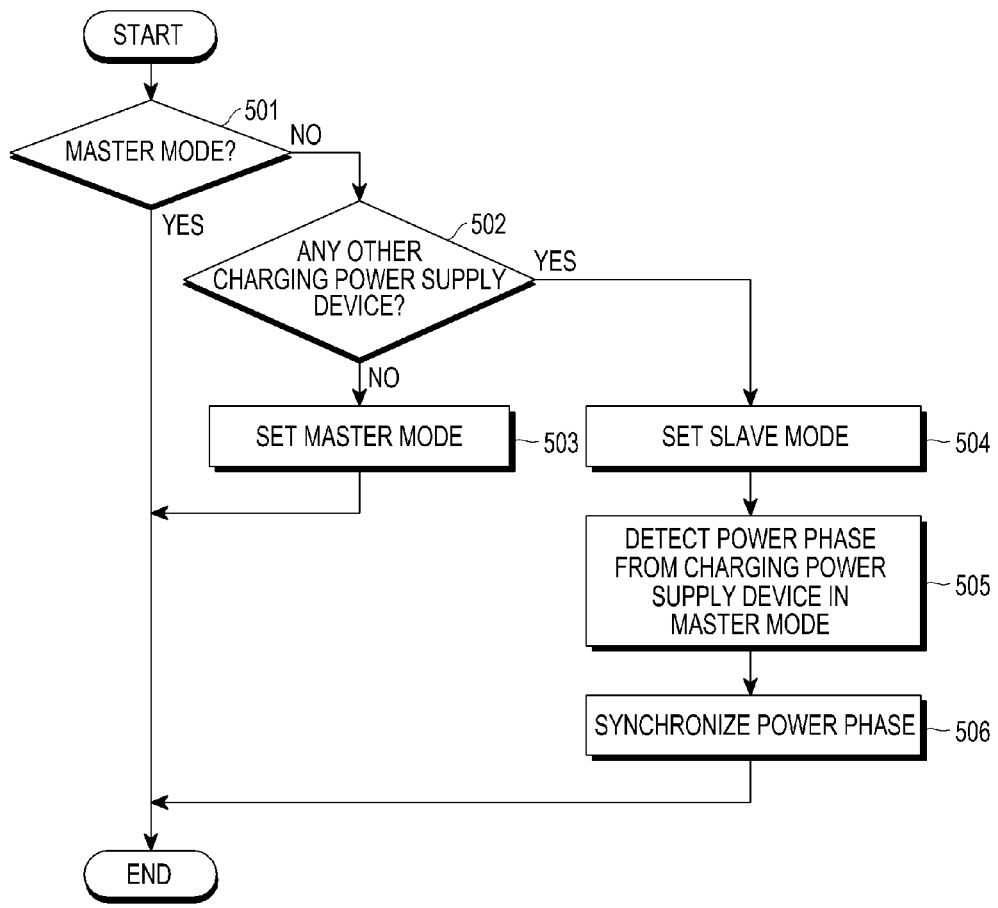
FIG. 5 illustrates an example of the power phase synchronization step 402 in FIG. 4 according to an embodiment of the present invention.

FIG. 5 illustrates an example of the power phase synchronization step 402 in FIG. 4 according to an embodiment of the present invention, in which a charging power supply device synchronizes a phase of wireless power.

It is assumed that a charging power supply device providing a reference signal for power phases is set to operate in a master mode, and a charging power supply device detecting a power phase of another charging power supply device is set to operate in a slave mode.

If it is determined that the charging power supply device is set to operate in a master mode (Yes in step 501), the power phase synchronization step is ended. However, if the charging power supply device is not set to operate in a master mode (No in step 501), it is determined whether another charging power supply device exists within a predetermined range in step 502. If another charging power supply device does not exist within a predetermined range (No in step 502), the mode for wireless power supply of the charging power supply device is re-set as a master mode in step 503. If another charging power supply device exists within a predetermined range (Yes in step 502), the mode for wireless power supply is set as a slave mode in step 504.

As the mode for wireless power supply is set as a slave mode, the charging power supply device in a slave mode detects a power phase from the charging power supply device in a master mode in step 505. For example, the charging power supply device in the slave mode detects a phase of the wireless power from the wireless power signal that another charging power supply device transmits to the mobile terminal. Next, the charging power supply device in the slave mode controls a phase of its output power to be synchronized with the detected power phase in step 506.

Figure 6:
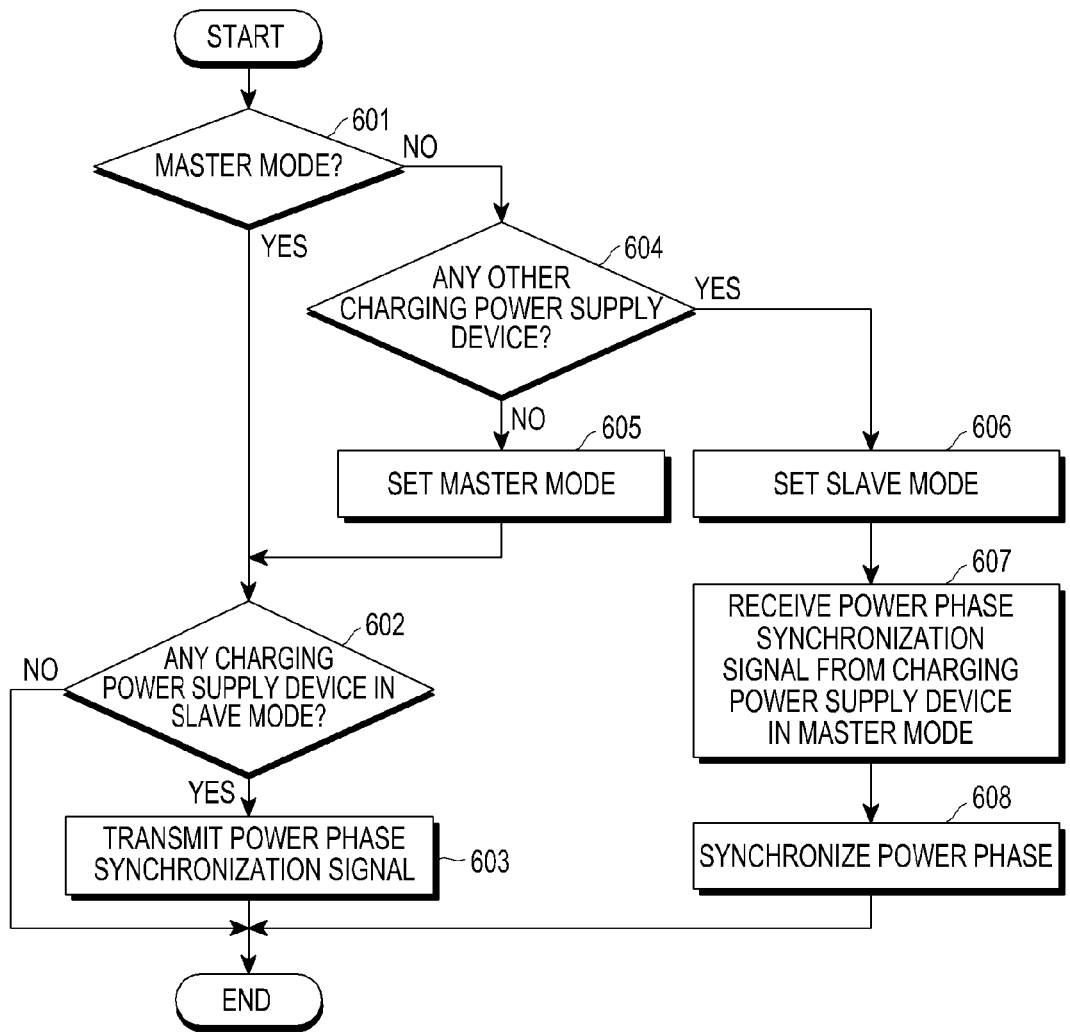
FIG. 6 illustrates another example of the power phase synchronization step 402 in FIG. 4 according to an embodiment of the present invention.

FIG. 6 illustrates another example of the power phase synchronization step 402 in FIG. 4 according to an embodiment of the present invention, in which a charging power supply device synchronizes a phase of wireless power.

Another example of the power phase synchronization step illustrated in FIG. 6 is equal to that in FIG. 5 except that a charging power supply device in a master mode transmits a synchronization signal for synchronization of power phases, and a charging power supply device in a slave mode checks a phase of wireless power output from the charging power supply device in the master mode based on the synchronization signal. Specifically, the charging power supply device in the master mode further performs steps 602 and 603, and the charging power supply device in the slave mode checks a phase of wireless power based on the synchronization signal in step 607.

Another example of the power phase synchronization step according to an embodiment of the present invention will now be described in detail.

If it is determined that the charging power supply device is set to operate in a master mode (Yes in step 601), it is determined whether a charging power supply device set to operate in a slave mode exists within a predetermined range in (step 602. In the absence of a charging power supply device set to operate in a slave mode, the power phase synchronization step is ended. In the presence of a charging power supply device set to operate in a slave mode, the charging power supply device set to operate in a master mode checks its power phase, and transmits a power phase synchronization signal including the checked power phase to the charging power supply device set to operate in a slave mode in step 603. The power phase synchronization signal may be transmitted on a beacon signal.

If the charging power supply device is not set to operate in a master mode (No in step 601), it is determined whether another charging power supply device exists within a predetermined range in step 604. If another charging power supply device does not exist within a predetermined range (No in step 604), the mode for wireless power supply of the charging power supply device is re-set as a master mode in step 605. If another charging power supply device exists within a predetermined range (Yes in step 604), the mode for wireless power supply is set as a slave mode in step 606.

As the mode for wireless power supply is set as a slave mode, the charging power supply device in the slave mode receives a power phase synchronization signal from the charging power supply device in the master mode, and detects a power phase included in the synchronization signal in step 607. The charging power supply device in the slave mode controls a phase of its output power to be synchronized with the detected power phase in step 608.

While the mobile terminal and the charging power supply device are performing wireless charging, a new charging power supply device may additionally request to supply wireless power to the mobile terminal. To this end, while the mobile terminal and the charging power supply device are performing wireless charging, the charging power supply device may receive the wireless charging request from a user in step 401 of receiving a wireless power request.

Multiple charging power supply devices may exist around a mobile terminal, and may simultaneously provide their wireless power to the mobile terminal. To do so, phases of their wireless power may have been synchronized. Therefore, in order for a new charging power supply device to additionally supply wireless power to the mobile terminal, the new charging power supply device performs a process of synchronizing a phase of wireless power in step 402. Specifically, the new charging power supply device is set to operate in a slave mode, and may detect a power phase from the power transmitted from the charging power supply device in the master mode and synchronize its power phase with the detected power phase as in the former example of the power phase synchronization step, or may request and receive a power phase synchronization signal from the charging power supply device in the master mode and synchronize its power phase with that of the charging power supply device in the master mode as in the latter example of the power phase synchronization step.

In step 403, the charging power supply device performs a process of transmitting wireless power to the mobile terminal that is being supplied wireless power from another charging power supply device. For example, the charging power supply device may perform a process of determining whether wireless power transmission to the mobile terminal being supplied wireless power from another charging power supply device is allowed, and a process of transmitting wireless power depending on whether the wireless power transmission is allowed.

Figure 7:
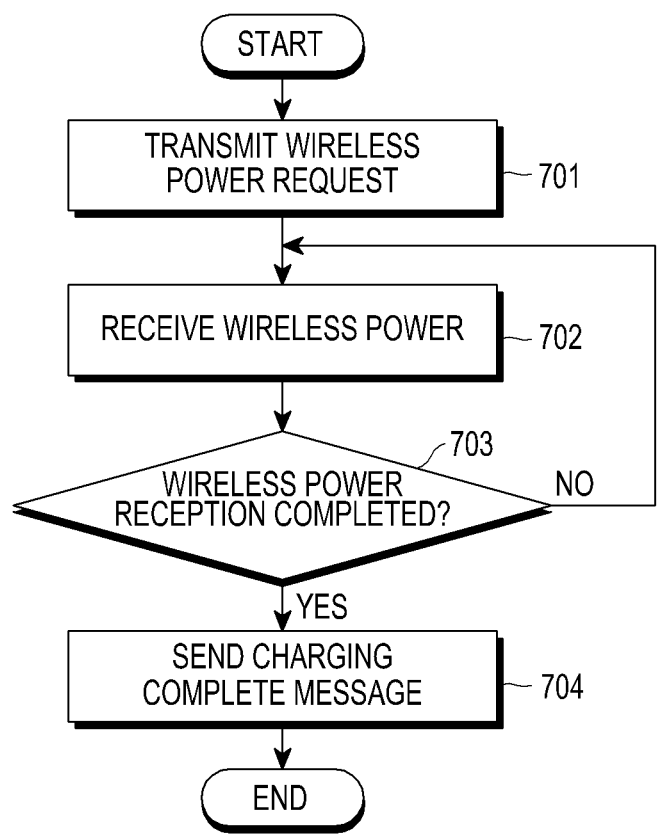
FIG. 7 illustrates a wireless charging method by a mobile terminal according to an embodiment of the present invention.

FIG. 7 illustrates a wireless charging method by a mobile terminal according to an embodiment of the present invention.

Referring to FIG. 7, the mobile terminal sends a message for requesting wireless power transmission in step 701. In other words, the mobile terminal broadcasts a message for requesting wireless power to its surrounding charging power supply devices. For example, the mobile terminal provides an interface for allowing a user to set a start of wireless charging on a display, and receives an input indicating a start of wireless charging from the user. Upon receiving the input indicating a start of wireless charging from the user, the mobile terminal generates a message for requesting wireless power transmission and sends the message for requesting wireless power transmission to its surrounding charging power supply devices.

In step 702, the mobile terminal receives wireless power from the charging power supply device and charges the battery in the mobile terminal with the received wireless power.

In step 703, the mobile terminal determines whether wireless power reception is completed. If wireless power reception is completed (Yes in step 703), for example, upon receiving an end of wireless charging from the user, or upon receiving a signal indicating completion of wireless charging from the battery, the mobile terminal generates a message for requesting an end of wireless power transmission in response to an input from the user, which indicates an end of wireless power transmission, and sends the generated message for requesting an end of wireless power transmission to the charging power supply device in step 704. If wireless power transmission is not completed (No in step 703), the mobile terminal repeats wireless power reception in step 702.

The mobile terminal may receive conditions for a start and an end of wireless charging from the user through the interface. For example, the mobile terminal may receive conditions for a battery level required to start and end wireless charging, for a time to start and end wireless charging, and for a position to start and end wireless charging.

Therefore, in step 701, the mobile terminal may generate a message for requesting wireless power by determining whether it meets the conditions for a start of wireless charging, and send the message for requesting wireless power transmission to its surrounding charging power supply devices. For example, the mobile terminal may check the battery level at regular intervals to determine whether it meets the conditions for a battery level required to start wireless charging, and if the checked battery level is relatively lower than the battery level required to start wireless charging, the mobile terminal may generate a message for requesting wireless power transmission and send it to the charging power supply device.

The mobile terminal may determine whether wireless power reception is completed, by determining in step 703 whether it meets the conditions for an end of wireless power transmission. For example, the mobile terminal may check the battery level at regular intervals, and if the checked battery level is relatively higher than the full battery level as the battery charging is completed, then the mobile terminal may determine that the wireless power reception has been completed.

While receiving wireless power from at least one charging power supply device and performing wireless charging, the mobile terminal may further receive wireless power from a new charging power supply device. To this end, in step 702, upon receiving a request from the new charging power supply device to determine whether wireless power transmission is allowed, the mobile terminal determines whether wireless power transmission is allowed by either requesting a user to input (click) an allowance/non-allowance icon on the display and receiving a response to the request from the user, or depending on the conditions set in advance by the user. Once it is determined whether wireless power transmission is allowed, the mobile terminal may send a message including information indicating the allowance/non-allowance of wireless power transmission to the new charging power supply device. If wireless power transmission is allowed, the mobile terminal may receive wireless power from the new charging power supply device.

Figure 8:
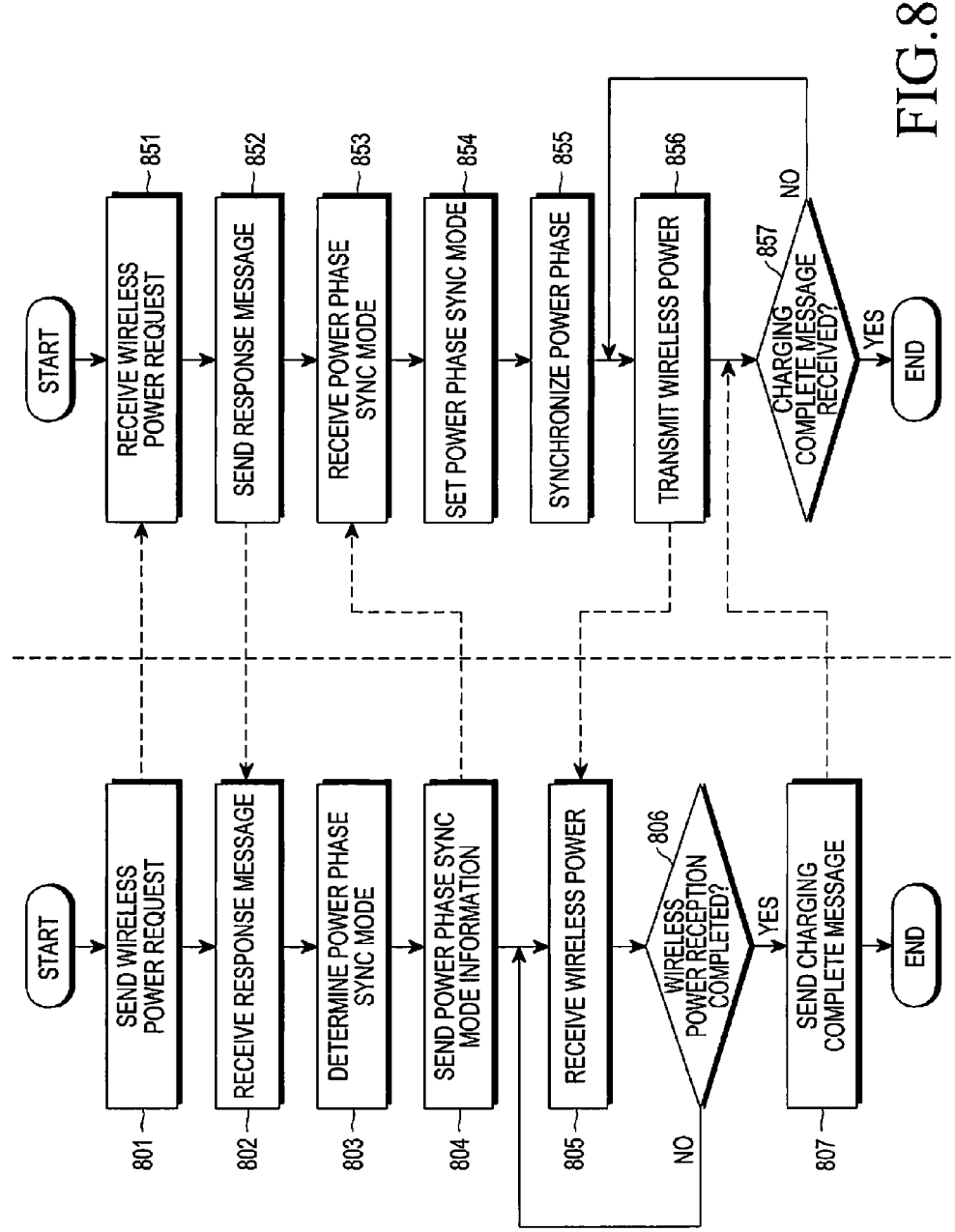
FIG. 8 illustrates a wireless charging method according to another embodiment of the present invention.

FIG. 8 illustrates a wireless charging method according to another embodiment of the present invention.

Referring to FIG. 8, steps 801 to 807 represent a process performed by a mobile terminal, and steps 851 to 856 represent a process performed by a charging power supply device.

In step 801, the mobile terminal sends a message for requesting wireless power transmission to its surrounding charging power supply devices as in step 701. In other words, the mobile terminal broadcasts a message for requesting wireless power to its surrounding charging power supply devices. For example, the mobile terminal provides an interface for allowing a user to set a start of wireless charging on a display, and receives an input indicating a start of wireless charging from the user, at which time the mobile terminal generates a message for requesting wireless power transmission and sends the message for requesting wireless power transmission to its surrounding charging power supply devices.

In response, at least one charging power supply device receives the message for requesting wireless power transmission from the mobile terminal in step 851. In step 852, the charging power supply device generates a response message to the message for requesting wireless power transmission, and sends it to the mobile terminal. The mobile terminal receives the response message in step 802. Because multiple charging power supply devices may exist around the mobile terminal, the mobile terminal may receive response messages from the multiple charging power supply devices and handle the received response messages in step 802.

In step 803, the mobile terminal determines a synchronization mode of at least one charging power supply device based on the response message. For example, taking power strength of a wireless signal into account, the mobile terminal may determine a synchronization mode of a charging power supply device having a relatively high signal strength as a master mode, and determine synchronization modes of other charging power supply devices as a slave mode.

In step 804, the mobile terminal transmits information about the mode determined in step 803 to each of the charging power supply devices. For example, in step 804, the mobile terminal sends a message including information about the synchronization mode to each of the charging power supply devices. The message including information about the synchronization mode may further include information about a power phase of the charging power supply device of which a synchronization mode is determined as a master mode. To this end, the response message that the charging power supply device sent in step 852 may include information about the power phase of each charging power supply device.

In step 853, the at least one charging power supply device receives the message including information about the synchronization mode from the mobile terminal. In step 854, the charging power supply device checks the synchronization mode from the message including information about the synchronization mode, and then sets the synchronization mode determined by the mobile terminal as its synchronization mode. In step 855, the charging power supply device synchronizes its power phase with the power phase of the charging power supply device in the master mode. The charging power supply device may synchronize its power phase with the power phase included in the message including information about the synchronization mode.

Although the charging power supply device synchronizes its power phase with the power phase included in the message including information about the synchronization mode, the present invention is not limited thereto, and the charging power supply device in a slave mode may request information about the power phase from the charging power supply device in a master mode and synchronize its power phase based thereon, or the charging power supply device in a slave mode may detect information about a power phase from the signal output from the charging power supply device in the master mode and synchronize its power phase with the detected power phase, as in the methods illustrated in FIGS. 4 and 5.

In step 856, the charging power supply device transmits its wireless power to the mobile terminal. In response, in step 805, the mobile terminal receives the wireless power from the charging power supply device and charges its battery with the received wireless power. In step 806, the mobile terminal determines whether the wireless power reception has been completed. If the wireless power reception has been completed (Yes in step 806), for example, upon receiving an input indicating an end of wireless charging from the user, or upon a signal indicating completion of wireless charging from the battery, the mobile terminal generates a message for requesting an end of wireless power transmission in response to an input from the user, which indicates an end of wireless power transmission, and sends the generated message for requesting an end of wireless power transmission to the charging power supply device in step 807. If the wireless power reception has not been completed (No in step 806), the mobile terminal repeats wireless power reception in step 805.

Upon receiving the message for requesting an end of wireless power transmission from the mobile terminal in step 857, the charging power supply device ends the wireless power transmission to the mobile terminal and no longer transmits wireless power.

As is apparent from the foregoing description, the wireless charging method and apparatus according to the present invention may minimize a power loss when a plurality of charging power supply devices simultaneously transmit their charging power to at least one mobile terminal.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A wireless charging method of a charging power supply device, comprising:
   setting a power phase synchronization mode of the charging power supply device to one of a first mode and a second mode;
   synchronizing a power phase of the charging power supply device and another power phase of another charging power supply device, based on the power phase synchronization mode; and
   wirelessly charging a terminal using the synchronized power phase,
   wherein in the first mode, the power phase of the charging power supply device is a reference for the another charging power supply device to synchronize the another power phase with the power phase of the charging power supply device, and
   wherein in the second mode, the another power phase of the another charging power supply device is used as a reference for the charging power supply device to synchronize the power phase with the another power phase of the another charging power supply device.

2. The wireless charging method of claim 1, wherein, in the first mode, synchronizing the power phase of the charging power supply device and the another power phase of the another charging power supply device comprises transmitting, to the another charging power supply device, a synchronization signal for synchronizing the another power phase with the power phase of the charging power supply device.

3. The wireless charging method of claim 1, wherein, in the second mode, synchronizing the power phase of the charging power supply device and the another power phase of the another charging power supply device comprises:
   requesting, from the another operating in the first mode, a synchronization signal for synchronizing the power phase with the another power phase of the another charging power supply device;
   receiving, from the another operating in the first mode, the synchronization signal; and
   synchronizing the power phase with the another power phase of the another charging power supply device, based on the synchronization signal.

4. The wireless charging method of claim 1, further comprising receiving a wireless charging request from the terminal.

5. The wireless charging method of claim 4, further comprising:
   sending a response to the wireless charging request from the terminal; and
   receiving, from the terminal, information for setting the power phase synchronization mode of the charging power supply device to one of the first mode and the second mode.

6. The wireless charging method of claim 1, wherein, in the second mode, synchronizing the power phase of the charging power supply device and the another power phase of the another charging power supply device comprises:
   receiving, from the another charging power supply device in the first mode, a synchronization signal for synchronizing the power phase with the another power phase of the another charging power supply device; and
   synchronizing the power phase of the charging power supply device with the another power phase of the another charging power supply device, based on the synchronization signal.

7. The wireless charging method of claim 1, wherein, in the second mode, synchronizing the power phase of the charging power supply device and the another power phase of the another charging power supply device comprises:
   detecting, the another power phase from a charging power supplied to the terminal from the another charging power supply device operating in the first mode; and
   synchronizing the power phase of the charging power supply device operating in the second mode with the another power phase of the another charging power supply device, based on the detected another power phase.

8. A charging power supply device comprising:
   a wireless charging handler for controlling supply of charging power;
   a power phase synchronizer configured to operate in one of a first mode and a second mode for synchronizing a power phase of the charging power supply device with another power phase of another charging power supply device; and
   a power converter for converting power supplied from a power supply into wireless power to be supplied to a terminal based on the synchronized power phase,
   wherein in the first mode, the power phase of the charging power supply device is a reference for the another charging power supply device to synchronize the another power phase with the power phase of the charging power supply device, and wherein in the second mode, the another power phase of the another charging power supply device is used as a reference for the power phase synchronizer to synchronize the power phase with the another power phase of the another charging power supply device.

9. The charging power supply device of claim 8, wherein the power phase synchronizer operates in the second mode after detecting that the another charging power supply device in operating in the first mode.

10. The charging power supply device of claim 8, wherein the wireless charging handler sends a response to a wireless charging request from the terminal, receives, from the terminal, information about a power phase synchronization mode determined by the terminal, and controls the power phase synchronizer to operate in one of the first mode and the second mode, based on the received information.

11. The charging power supply device of claim 8, wherein, in the first mode, the power phase synchronizer transmits a synchronization signal for synchronizing power phases.

12. The charging power supply device of claim 8, wherein, in the second mode, the power phase synchronizer receives a synchronization signal from the another charging power supply device operating in the first mode, and synchronizes the power phase of the charging power supply device with the another power phase of the another charging power supply device, based on the synchronization signal.

13. The charging power supply device of claim 8, wherein, in the second mode, the power phase synchronizer detects the another power phase from a charging power that the another charging power supply device operating in the first mode supplies to the terminal, and synchronizes the power phase of the charging power supply device with the another power phase of the another charging power supply device, based on the detected power phase.

14. A wireless charging method comprising:
sending a wireless charging request to a charging power supply device;
receiving a response to the wireless charging request from the charging power supply device;
setting a power phase synchronization mode of the charging power supply device to one of a first mode and a second mode;
synchronizing a power phase of the charging power supply device with another power phase of another charging power supply device, based on the power phase synchronization mode; and
controlling the charging power supply device to perform wireless charging,
wherein in the first mode, the power phase of the charging power supply device is a reference for the another charging power supply device to synchronize the another power phase with the power phase of the charging power supply device, and
wherein in the second mode, the another power phase of the another charging power supply device is used as a reference for the charging power supply device to synchronize the power phase with the another power phase of the another charging power supply device.

15. The wireless charging method of claim 14, wherein synchronizing the power phase comprises transmitting information about the power phase synchronization mode to the charging power supply device.

16. The wireless charging method of claim 14, wherein synchronizing the power phase comprises transmitting information about the another power phase of the another charging power supply device operating in the first mode to the charging power supply device operating in the second mode.

17. A mobile terminal comprising:
a wireless charging handler for setting a power phase synchronization mode of a charging power supply device to one of a first mode and a second mode, synchronizing a power phase of the charging power supply device with another power phase of another charging power supply device, based on the power phase synchronization mode, and controlling wireless charging; and
a wireless power receiver for receiving wireless power supplied from the charging power supply device, and supplying the received wireless power to a battery,
wherein in the first mode, the power phase of the charging power supply device is a reference for the another charging power supply device to synchronize the another power phase with the power phase of the charging power supply device, and
wherein in the second mode, the another power phase of the another charging power supply device is used as a reference for the charging power supply device to synchronize the power phase with the another power phase of the another charging power supply device.

18. The mobile terminal of claim 17, wherein wireless charging handler transmits information about the power phase synchronization mode to the charging power supply device.

19. The mobile terminal of claim 17, wherein the wireless charging handler transmits information about the another power phase of the another charging power supply device operating in the first mode to the charging power supply device operating in the second mode.

* * * * *